US012791703B2

(12) United States Patent
Hasselbring et al.

(10) Patent No.: US 12,791,703 B2
(45) Date of Patent: Nov. 10, 2026

(54) DISTRIBUTED DETECTION OF LIVING BEINGS THROUGH WALLS WHILE IN MOTION

(71) Applicant: Honeywell International Inc., Charlotte, NC (US)

(72) Inventors: Alan Joseph Hasselbring, Glendale, AZ (US); Daniel G. Lopez, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 198 days.

(21) Appl. No.: 18/907,737

(22) Filed: Oct. 7, 2024

(65) Prior Publication Data

US 2026/0098958 A1 Apr. 9, 2026

(51) Int. Cl.
*G01S 13/88* (2006.01)
*G01C 21/16* (2006.01)

(52) U.S. Cl.
CPC ........ *G01S 13/888* (2013.01); *G01C 21/1652* (2020.08)

(58) Field of Classification Search
CPC ........ G01S 13/888; G01S 13/86; G01S 13/87; G01S 7/415; G01C 21/1652
See application file for complete search history.

(56) References Cited

U.S. PATENT DOCUMENTS 9,229,102 B1 * 1/2016 Wright .................. G01S 13/885
12,117,550 B2 * 10/2024 Iizuka .................. G01S 5/0278

FOREIGN PATENT DOCUMENTS

CN 109031277 A 12/2018
CN 110988871 A * 4/2020 ............ G01S 13/89
CN 113820709 A 12/2021

OTHER PUBLICATIONS

Kocur, Dušan, Mária Švecová, and Jana Rovňáková. "Through-the-wall localization of a moving target by two independent ultra wideband (UWB) radar systems." Sensors 13, No. 9 (2013): 11969-11997. (Year: 2013).*

(Continued)

*Primary Examiner* — Yonghong Li
(74) *Attorney, Agent, or Firm* — Fogg & Powers LLC

(57) ABSTRACT

A system comprises: first through-wall sensing radar transceiver(s) configured to sense living being(s) within area at first current location; second through-wall sensing radar transceiver(s) configured to sense living being(s) within area at second current location; first and second inertial navigation systems corresponding to first and second through-wall sensing radar transceivers, wherein first and second inertial navigation systems compute position data relating to first and second current locations; and circuitry configured to: receive first ranging data pertaining to current location of living being(s) relative to first current location from first through-wall sensing radar transceiver(s); receive second ranging data pertaining to current location of living being(s) relative to second current location from second through-wall sensing radar transceiver(s); receive position data relating to first and second current locations from first and/or second inertial navigation systems; and determine current location of living being(s) based on first ranging data, second ranging data, and position data.

20 Claims, 6 Drawing Sheets

(56) References Cited

OTHER PUBLICATIONS

Hillyard, Peter, Dustin Maas, Sriram Premnath, Neal Patwari, and Sneha Kasera. "Through-wall person localization using transceivers in motion." arXiv preprint arXiv:1511.06703 (2015). (Year: 2015).*
CN_110988871_A_I_translate.pdf (Year: 2020).*
CN110988871_Fig1_translate.pdf (Year: 2020).*
Hillyard et al., "Through-Wall Person Localization Using Transceivers in Motion", ArXiv:1511.06703v1, Nov. 20, 2015, pp. 1 through 10.
Peabody et al., "Through-Wall Imaging Radar", Lincoln Laboratory Journal, vol. 19, No. 1, 2012, pp. 62 through 72.
Sevigny, "Joint through-wall 3-D radar imaging and motion detection using a stop-and-go SAR trajectory", 2016 IEEE Radar Conference, Jun. 2016, pp. 1 through 9.

* cited by examiner

DISTRIBUTED DETECTION OF LIVING BEINGS THROUGH WALLS WHILE IN MOTION

BACKGROUND

Radio Detection and Ranging (radar) systems may use radio waves to determine at least one of distance, direction/orientation, and/or velocity of objects relative to the radar system.

SUMMARY

A system, comprises: at least a first through-wall sensing radar transceiver configured to sense at least one living being within an area as the at least the first through-wall sensing radar transceiver moves through the area at a first current location; at least a second through-wall sensing radar transceiver configured to sense the at least one living being within the area as the at least the second through-wall sensing radar transceiver moves through the area at a second current location that is different than the first current location of the at least the first through-wall sensing radar transceiver; a first inertial navigation system positioned with and corresponding to the at least the first through-wall sensing radar transceiver; a second inertial navigation system positioned with and corresponding to the at least the second through-wall sensing radar transceiver, wherein the first inertial navigation system and the second inertial navigation system are configured to compute position data relating to the first current location of the at least the first through-wall sensing radar transceiver and the second current location of the at least the second through-wall sensing radar transceiver; and circuitry configured to: receive first ranging data from the at least the first through-wall sensing radar transceiver, the first ranging data pertaining to a current location of the at least one living being relative to the first current location of the at least the first through-wall sensing radar transceiver while the at least the first through-wall sensing radar transceiver moves through the area; receive second ranging data from the at least the second through-wall sensing radar transceiver, the second ranging data pertaining to the current location of the at least one living being relative to the second current location of the at least the second through-wall sensing radar transceiver while the at least the second through-wall sensing radar transceiver moves through the area; receive the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

A method, comprises: sensing at least one living being within an area using at least a first through-wall sensing radar transceiver moving through the area at a first current location; sensing the at least one living being within the area using at least a second through-wall sensing radar transceiver moving through the area at a second current location that is different than the first current location of the at least the first through-wall sensing radar transceiver; computing position data relating to the first current location of the at least the first through-wall sensing radar transceiver and the second current location of the at least the second through-wall sensing radar transceiver using a first inertial navigation system corresponding to and positioned with the at least the first through-wall sensing radar transceiver at the first current location and a second inertial navigation system corresponding to and positioned with the at least the second through-wall sensing radar transceiver at the second current location; receiving first ranging data from the at least the first through-wall sensing radar transceiver, the first ranging data pertaining to a current location of the at least one living being relative to the first current location of the at least the first through-wall sensing radar transceiver; receiving second ranging data from the at least the second through-wall sensing radar transceiver, the second ranging data pertaining to the current location of the at least one living being relative to the second current location of the at least the second through-wall sensing radar transceiver; receiving the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

A system, comprises: at least a first through-wall sensing radar transceiver mounted to a first vehicle, the at least the first through-wall sensing radar transceiver configured to sense at least one living being within an area as the first vehicle moves the at least the first through-wall sensing radar transceiver through the area at a first current location; at least a second through-wall sensing radar transceiver mounted to a second vehicle, the at least the second through-wall sensing radar transceiver configured to sense the at least one living being within the area as the second vehicle moves the at least the first through-wall sensing radar transceiver through the area at a second current location that is different than the first current location of the at least the first through-wall sensing radar transceiver; a first inertial navigation system mounted to the first vehicle, the first inertial navigation system corresponding to the at least the first through-wall sensing radar transceiver; a second inertial navigation system mounted to the second vehicle, the second inertial navigation system corresponding to the at least the second through-wall sensing radar transceiver, wherein the first inertial navigation system and the second inertial navigation system are configured to compute position data relating to the first current location of the at least the first through-wall sensing radar transceiver and the second current location of the at least the second through-wall sensing radar transceiver; and circuitry configured to: receive first ranging data from the at least the first through-wall sensing radar transceiver, the first ranging data pertaining to a current location of the at least one living being relative to the first current location of the at least the first through-wall sensing radar transceiver while the first vehicle moves through the area; receive second ranging data from the at least the second through-wall sensing radar transceiver, the second ranging data pertaining to the current location of the at least one living being relative to the second current location of the at least the second through-wall sensing radar transceiver while the second vehicle moves through the area; receive the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
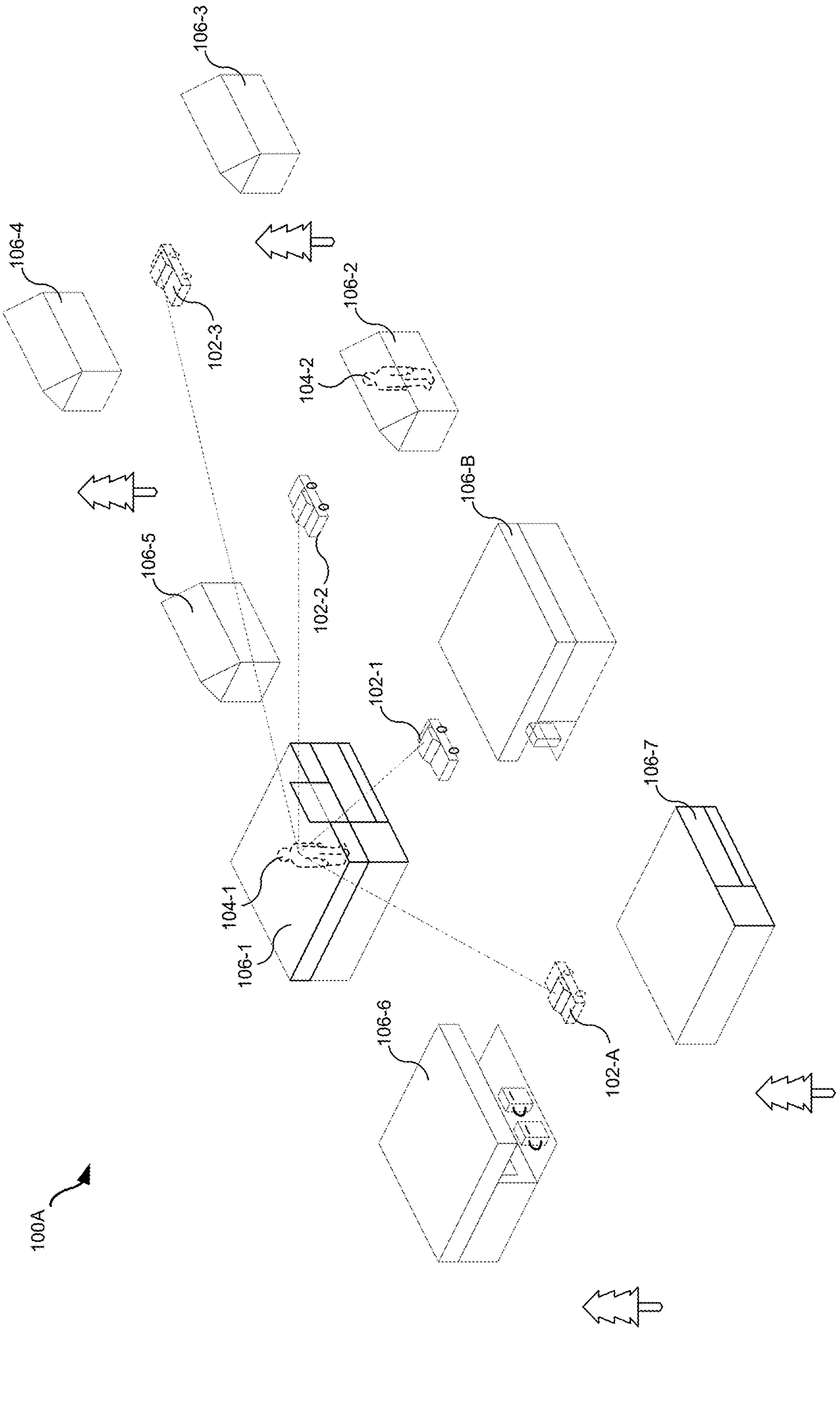
FIGS. 1A-1D are block diagrams illustrating exemplary systems for sensing living beings using radar and an inertial navigation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In examples, radar systems (radio detection and ranging systems) may use radio waves to determine at least one of distance, direction/orientation, and/or velocity of objects relative to the radar system. In examples, radar systems can be configured to detect objects through walls. In examples, radar systems can be configured to detect living beings (such as humans and/or animals) based on detection of changes in radar signatures of the living beings based on breathing, heart beats, or other indicators of life (which may be small motions of only a few Hertz (Hz) in frequency). In examples, radar systems can be configured to detect living beings (such as humans and/or animals) through walls and other objects. In examples, through-wall living being detection radar systems may be mounted on a wall or within a few feet of a wall for the radar to work well. In examples, through-wall living being detection radar systems are very large (such as consuming virtually an entire vehicle) to enable detection of living beings behind walls from a significant distance (such as over a hundred meter). In examples, living being detection radar systems work better when they are stationary.

In examples, it is desirable for warfighters in mechanized convoys (such as soldiers riding in vehicles) through hostile areas (such as villages with hostile fighters hiding behind walls of buildings and structures) to know which buildings contain living beings and which do not. In examples, it is desirable for the warfighters to have this information from significant distances (such as hundreds of meters), without requiring the following for the radar systems to sense living beings through the walls or other objects: (1) large radar equipment on dedicated vehicles; (2) that the warfighters stop moving to operate using the radar; and/or (3) that the warfighters have to dismount the vehicles to setup the radar equipment before operating the radar equipment. In examples, specific modalities, sensors, and signal processing techniques can be used to create new technology for detection, tracking, and recognition of living beings (such as humans or animals) inside or behind buildings or structures, at a distance and/or while in motion, minimizing the ability for enemies to hide and enabling buildings with any living beings to be identified and located.

In examples, living being detecting radar systems can detect living beings (such as humans and animals) through walls and other objects by differentiating relatively small return signals from the bodies of the living beings (such as humans and animals) from far stronger return signals of the walls or other objects being penetrated by the radar signals and other objects within the area surrounding the living beings. In examples, the relatively small return signals from the bodies of the living beings (such as humans and animals) can be separated from the returns of inanimate objects using algorithms which search for a doppler return signals with frequencies proprietary to living being functions (such as breathing, heartbeat, walking, etc.) which can be separated from the returns of inanimate objects (even including moving objects such as ceiling fans) by using a variety of algorithms relating to Fast Fourier Transforms (FFTs), etc.

In examples, radar systems mounted on moving vehicles may contain frequencies and/or harmonics that more closely resemble frequencies and/or harmonics of a body of a living being (such as a human body or an animal body, which makes it far more difficult to detect living beings (such as humans and animals) on the other side of walls of buildings and/or structures. In examples, living being detecting radar systems can best detect living beings (such as humans and animals) through walls when the radar system includes a plurality of radars spread apart and located at different angles relative to the target being observed, such as 90 degrees from each other. In examples, if the plurality of radars were located at the same location (where the angle between them is approximately 0 degrees), then a solution cannot be computed. In examples, radars (such as those with large radar dishes) can be located at hundreds of meters from a target area. In examples, even with these large radar dishes, at hundreds of meters, the difference in the angles of each radar relative to the target is relatively small, which can make accurate subject-location relatively difficult.

In examples, specific methods, devices, and systems can be used to improve the ability of the radar system to find living being targets (such as humans and animals) in settings with substantial walls and/or other objects between the radar system and the living being targets (such as humans and animal), such as in urban settings with many buildings and other obstructions. In examples, the broader system includes a plurality of radar systems mounted on various vehicles (or carried by operators) spread apart through a moving convoy. In examples, the bigger the angle between the plurality of radar systems mounted on different vehicles spread apart through the moving convoy, the more accurate it can be further away. In examples where the distance between the plurality of radar systems is smaller, you need to be closer to the wall with the living being targets behind it to accurately detect the living being targets as the angle would be too small at greater distances. In examples, having a radar system mounted on various vehicles in a convoy (particularly a longer convoy) allows for bigger angles between the target living beings, which allows for lower power radar signals while still maintaining accuracy.

In examples, each radar system mounted on each vehicle (or carried by each operator) may include a plurality of radar transceivers (such as between one and four small, inexpensive through-wall sensing radar transceivers). In examples, the radar systems mounted on teach vehicle (or carried by each operator) may be stabilized by an inertial navigation system (such as a Tactical Advanced Land Inertial Navigator (TALIN) produced by Honeywell® Aerospace, other Ring Laser Gyroscope (RLG) based inertial navigation systems, navigation or tactical grade inertial navigation systems (INS), navigation or tactical grade inertial measurement units (IMU), or other inertial navigation systems (INS) or inertial measurement units (IMU)). In examples, the radar systems may be stabilized using Global Navigation Satellite System (GNSS) data or radio ranging data for the positions of the through-wall sensing radar transceivers relative to one another.

In examples, the inertial navigation system is used for at least two functions in the system. First, the inertial navigation system measures and compensates for any human-like frequencies of the vehicle (or operator) carrying the radar systems which could confuse the living being (such as humans and animals) detection algorithms, such as traveling over bumps in a road or trail. In examples, data from the inertial navigation system can be used to mathematically remove or compensate for the movement of the radar systems from the data received from the radar systems. In examples, this could be done after receiving all the solutions from the various vehicles (or operators) or it could be done at a vehicle (or operator) or subset of vehicles (or operator) specific level.

Second, the inertial navigation system is used to precisely compute distances between each radar system on the different vehicles as the distance between the antennas changes. In examples, the inertial navigation system samples its precision inertial sensors at a high rate (such as over 1200 Hertz (Hz)), thereby allowing the distributed multi-vehicle (or multi-operator) carrying the radar systems to precisely compute the relative distances between each radar, in each vehicle, in real time, while in motion.

In examples, the large separation of the radars in the convoy creates a large virtual antenna with large angles relative to the living beings (such as humans and animals) in the buildings or otherwise obscured behind walls or other objects. In examples, this large angle greatly improves the radar systems accuracy in locating living beings (such as humans and animals) over a large radar mounted on a single vehicle (which does not have as large of an angle). In examples, the precisely time-tagged data from each radar in the convoy will be combined, processed, and displayed allowing a longer convoy (such as 100 meters long) to locate most living beings (such as humans and animals) in most rooms within most buildings in real-time within an area (such as a village). In examples, the smaller radar systems distributed across a plurality of vehicles (and/or operators) costs less and has a lower visual signature compared to larger radars mounted on a single (or few) vehicles. In examples, advanced active sensing algorithms may leverage machine learning and artificial intelligence (in addition to more traditional algorithms) to identify and precisely locate the living beings (such as humans and animals).

In examples, an airborne system (or partially airborne system) may include a plurality of drones (or other aerial devices) alone or in combination with ground based vehicles or operators to form the radar array instead of or in addition to surface vehicles. In examples, a mixed-domain option merges data from radars on airborne drones and surface vehicles. In examples, one or more airborne drone-based radar can be launched as a convoy enterers an area (such as a village) and can improve the accuracy of the algorithms detecting the living beings (such as humans and animals) in enabling vertically pinpointing the floor location or height of the living beings (such as in a multi-story building).

Figure 1B:
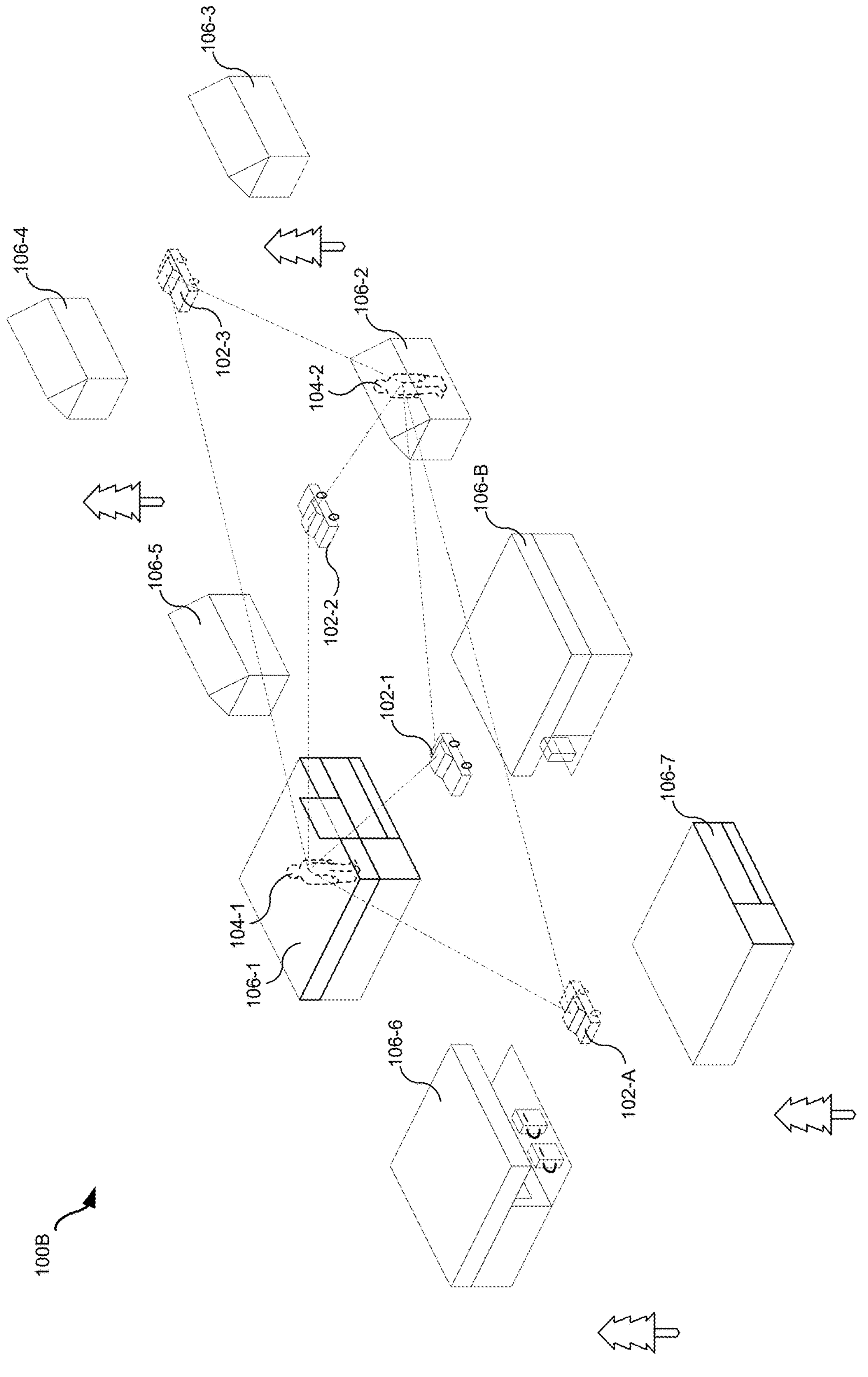
Figure 1C:
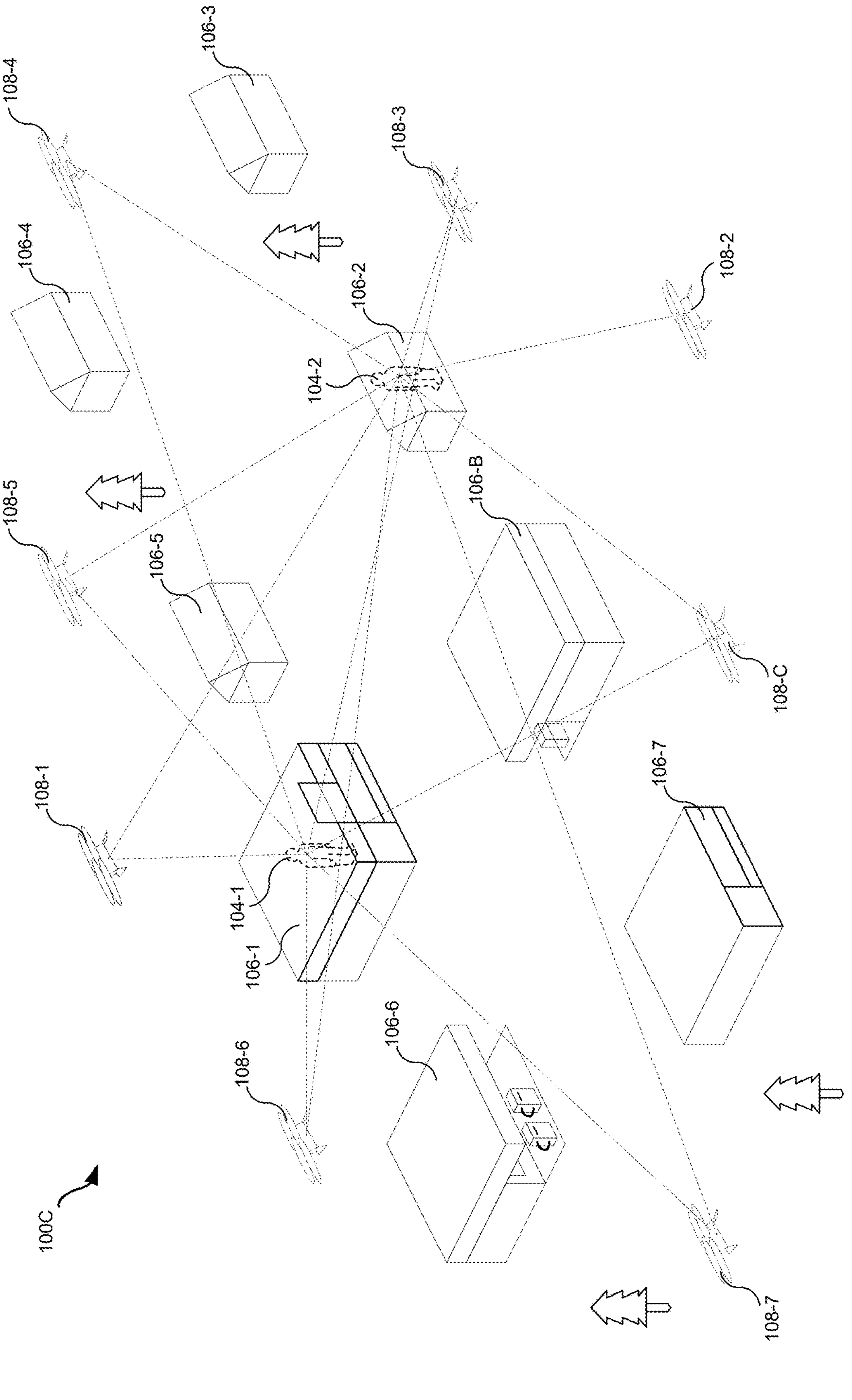
Figure 1D:
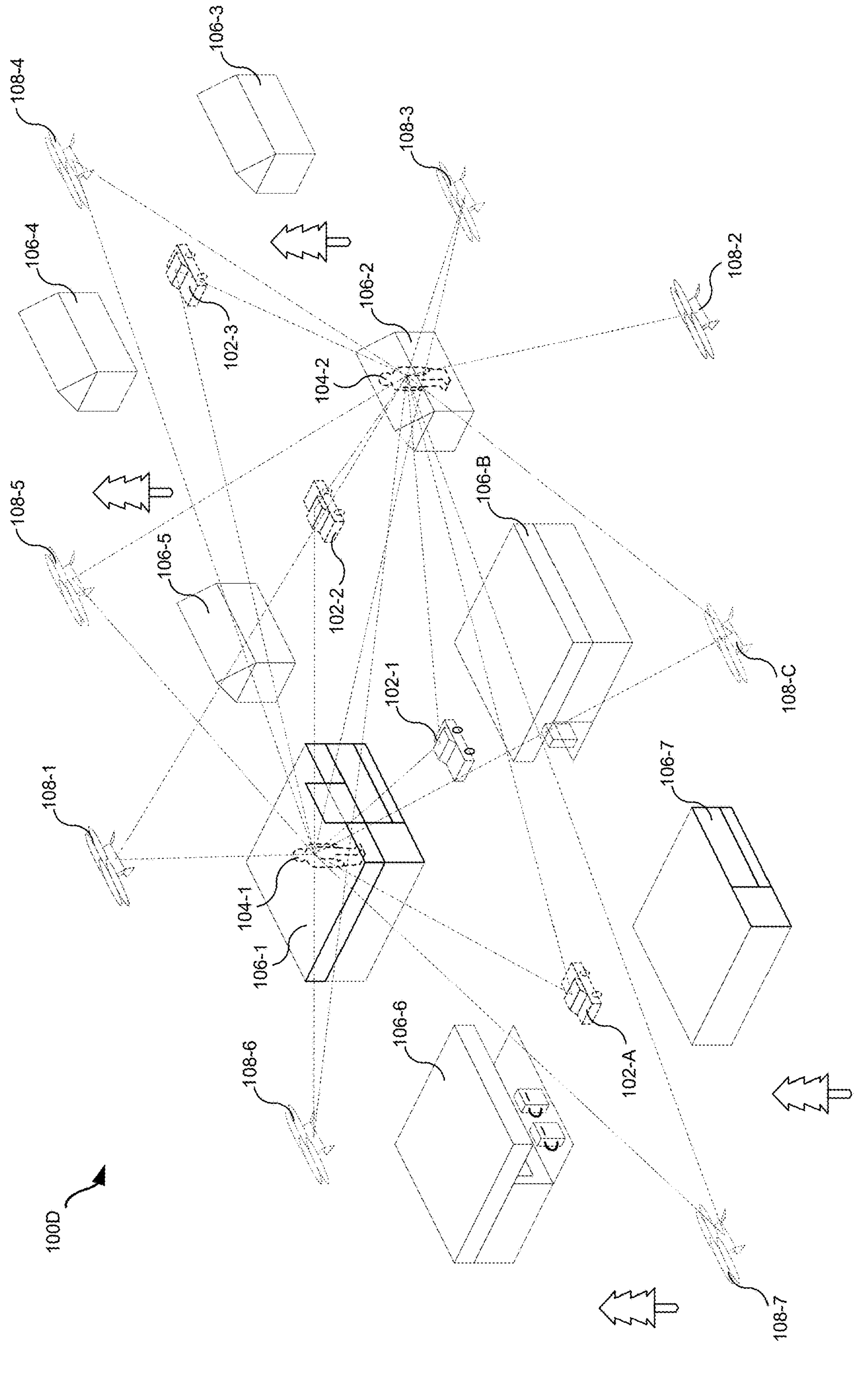

FIGS. 1A-1D are block diagrams illustrating exemplary systems 100 for sensing living beings using radar and an inertial navigation system. FIG. 1A shows system 100A that includes a plurality of ground vehicles 102 (such as ground vehicle 102-1, ground vehicle 102-2, and any quantity of optional ground vehicles 102 through optional ground vehicles 102-A), each having at least one radar transceiver configured to sense at least one living being 104 (such as living being 104-1) within (or behind or otherwise blocked by) at least one structure 106 (such as structure 106-1). FIG. 1B shows system 100B that includes a plurality of ground vehicles 102 (such as a ground vehicle 102-1, ground vehicle 102-2, and any quantity of optional ground vehicles 102 through optional ground vehicles 102-A) each having at least one radar transceiver configured to sense a plurality of living beings 104 (such as living being 104-1 and living being 104-2) within (or behind or otherwise blocked by) at least one structure 106 (such as structure 106-1 and structure 106-2). FIG. 1C shows system 100C that includes a plurality of airborne vehicles 108 (such as airborne vehicle 108-1, airborne vehicle 108-2, and any quantity of optional airborne vehicles 108 through airborne vehicle 108-B) within (or behind or otherwise blocked by) at least one structure 106 (such as structure 106-1 and structure 106-2). FIG. 1D shows a system 100D that includes at least one ground vehicle 102 (such as a ground vehicle 102-1 and any quantity of optional ground vehicles 102 through optional ground vehicles 102-A) and at least one airborne vehicle 108 (such as an airborne vehicle 108-1 and any quantity of optional airborne vehicles 108 through optional airborne vehicles 108-B) each having at least one radar transceiver configured to sense a plurality of living beings 104 (such as a living being 104-1 and a living being 104-2) within (or behind or otherwise blocked by) at least one structure 106 (such as structure 106-1 and structure 106-2). In examples, humans or animals or other vehicles, such as aquatic vehicles or space vehicles can include the at least one radar transceiver configured to sense the plurality of living beings 104.

Figure 2:
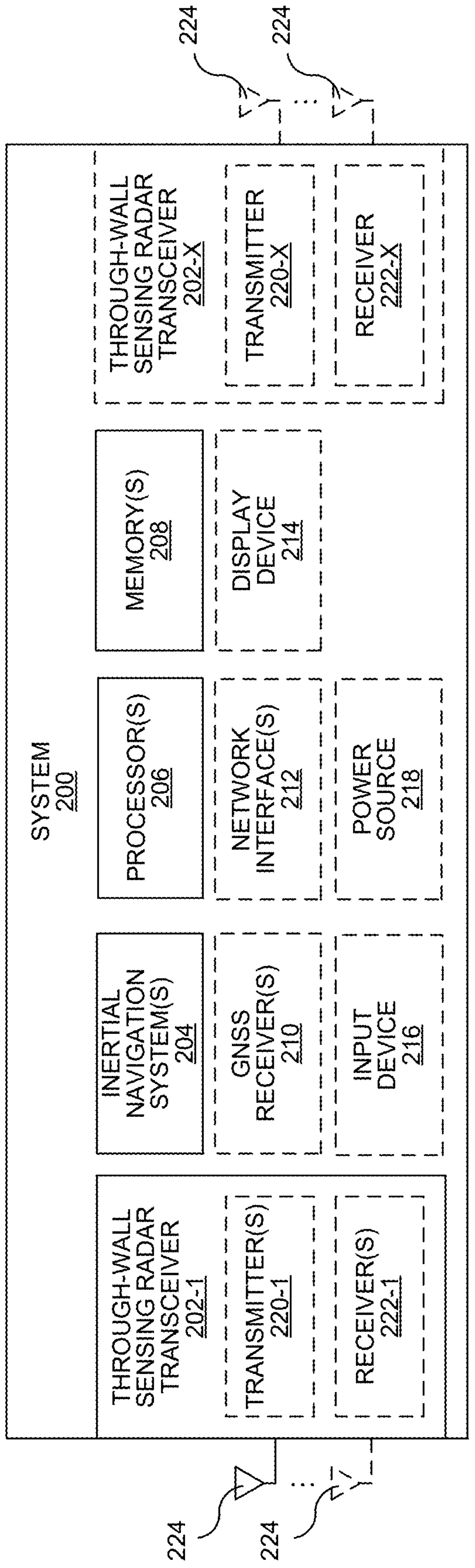
FIG. 2 is block diagrams illustrating a system that determines the current location of at least one living being.

FIG. 2 is block diagrams illustrating a system 200 that determines the current location of at least one living being. In examples, system 200 implements all or part of the systems used in the plurality of vehicles 102 (or units carried by people or animals) used in systems 100A-100D. In examples, system 200 includes at least one through-wall sensing radar transceiver 202 (such as through-wall sensing radar transceiver 202-1 and any quantity of optional through-wall sensing radar transceiver 202 through optional through-wall sensing radar transceiver 202-X), at least one inertial navigation system 204, at least one processor 206, at least one memory 208, at least one optional GNSS receiver 210, at least one optional network interface 212, optional display device 214, optional input device 216, and optional power source 218. In examples, the components of the system 200 can be implemented using any physical components and/or circuitry.

In examples, each through-wall sensing radar transceiver 202 includes at least one transmitter 220 (including any quantity of transmitters 220) and at least one receiver 222 (including any quantity of receivers 222) coupled to any quantity of antenna(s) 224. In examples, a transmitter 220 and a receiver 222 of a through-wall sensing radar transceiver 202 may each use separate antennas 224 or may use a single antenna 224 for transmission and reception. In examples, through-wall sensing radar transceivers 202 may include any number of mixer(s), oscillator(s), preamplifier(s), filter(s), clock(s), etc. In examples, a through-wall sensing radar transceiver 202 transmits radar signals (such as from a transmitter 220 using an antenna 224) and receives return signals reflected off of various living beings and objects (such as by the receiver 222 using an antenna 224).

In examples, system 200 uses the through-wall sensing radar transceiver 202 to detect the range of various living beings and objects based on the direction/orientation (such as an azimuth angle and/or an elevation angle) of the transmitted signals and/or returned signals as well as the time between transmission of the transmitted signals and return of the returned signals. In examples, the through-wall sensing radar is configured to transmit using radar signals that can penetrate walls and other objects to receive return signals from living beings (such as humans and animals) positioned on the other side of the walls and other objects. In examples, this enables living beings (such as humans and animals) to be identified in settings with many buildings and other obstructions (such as in urban setting). In examples, the living beings are identified using algorithms tuned to detect aspects of radar signatures (from radar returns) specific to living beings based on breathing, heart beats, or other indicators of life.

In examples, the system 200 uses the through-wall sensing radar transceiver 202 to determine a range between the through-wall sensing radar transceiver 202 and various living beings and objects based on the time between transmitted radar signals and returned reflections of the transmitted radar signals from the various living beings and objects. In examples, the through-wall sensing radar transceiver 202 can range the various living beings and objects to determine that the various living beings and objects are somewhere on an arc a certain distance (such as a certain quantity of meters) from the through-wall sensing radar transceiver 202. In examples, the system 200 would only be able to compute the location of the various living beings and objects if the through-wall sensing radar transceiver 202 is highly directional. In examples, at least two systems 200 (and possibly many systems 200) are used to determine the location of a particular living being or object to be where at least two separate arcs (a first arc corresponding to a first through-wall sensing radar transceiver 202 and a second arc corresponding to a second through-wall sensing radar transceiver 202 positioned at a different location) detecting the particular living being or object intersect.

In examples, the at least one inertial navigation system 204 is used for various functions in the system 200. In examples, the at least one inertial navigation system 204 is used to stabilize the signals received from the at least one through wall-sensing radar transceivers 202 by compensating for any human-like frequencies of the vehicle or operator carrying the radar systems which could confuse the detection of living beings (such as humans and animals). In examples, the at least one inertial navigation system 204 in one system 200 (such as traveling on first vehicle 102 or carried in a unit by an operator) communicates with at least a second inertial navigation system 204 in a second system 200 (such as traveling on a second vehicle 102 or carried in a second unit by a second operator) to determine relative positions between the one system 200 and the second system 200. In examples, the at least one inertial navigation system 204 can be a Tactical Advanced Land Inertial Navigator (TALIN) produced by Honeywell® Aerospace, other Ring Laser Gyroscope (RLG) based inertial navigation systems, navigation or tactical grade inertial navigation systems (INS), navigation or tactical grade inertial measurement units (IMU), or other inertial navigation systems (INS) or inertial measurement units (IMU)). In examples, the at least one through wall-sensing radar transceivers 202 of the system 200 may be stabilized using Global Navigation Satellite System (GNSS) data or radio ranging data for the positions of the through-wall sensing radar transceivers 202 on different vehicles (or with different operators) relative to one another.

In examples, a plurality of systems 200 use respective through-wall sensing radar transceiver(s) 202 and respective inertial navigation system(s) 204 to determine relative positions between through-wall sensing radar transceiver(s) 202 at each of the systems 200 and the target living being(s) as well relative positions between through-wall sensing radar transceiver(s) 202 at each of the systems 200 and other through-wall sensing radar transceiver(s) 202 at the other systems 200 while the systems 200 are in motion. In examples, a relatively large separation of the through-wall sensing radar transceiver(s) 202 at different systems 200 creates a large virtual antenna and larger angles relative to the living beings (such as humans and animals) being detected in the buildings or otherwise obscured behind walls or other objects greatly improves the accuracy in locating living beings (such as humans and animals) over a large radar mounted on a single vehicle (which does not have as large of angles relative to the living beings). In examples, including at least a portion of airborne vehicles in a mixed-domain option can improve the accuracy of the algorithms detecting the living beings (such as humans and animals) in enabling vertically pinpointing the floor location or height of the living beings (such as in a multi-story building).

In examples, the through-wall sensing radar transceiver 202 and/or the inertial navigation system(s) 204 include or receive at least one clock signal (such as from a GNSS receiver clock) to determine the time between transmission and return of the signals. In examples, the clock includes a crystal oscillator such as a temperature compensated crystal oscillator (TCXO), an oven controlled crystal oscillator (OCXO), voltage controlled crystal oscillator (VCXO), and/or a clock oscillator (XO). In examples, the clock is used by other components within the through-wall sensing radar transceiver 202, the at least one inertial navigation system 204, and/or the broader system 200. In examples, the clock is used to provide timing information. In examples, the clock is used to generate a clock used for converting between baseband and RF signals within the through-wall sensing radar transceiver 202 and/or system 200.

The at least one processor 206 can be any known processor, such as a general purpose processor (GPP) or special purpose (such as a field-programmable gate array (FPGA), application-specific integrated circuit (ASIC) or other integrated circuit or circuitry), any programmable logic device, or any circuitry. In examples, the at least one memory 208 can be any device, mechanism, or populated data structure used for storing information. In examples, the at least one memory 208 can be or include any type of volatile memory, nonvolatile memory, and/or dynamic memory. In examples, the at least one memory 208 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 208 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 208. The at least one memory 208 may be used to store instructions for running one or more applications or modules on the at least one processor 206. In examples, the at least one memory 208 could be used in one or more examples to house all or some of the instructions needed to execute the functionality discussed herein.

In examples, the at least one Global Navigation Satellite System (GNSS) receiver 210 can receive signals from GNSS satellites to determine a position of the GNSS receiver. In examples, GNSS constellations (including Global Positioning System (GPS), GLONASS, Galileo, BeiDou, etc.) include a plurality of GNSS satellites that transmit signals including information regarding position and time of transmission of the signals. In examples, signals are received from a plurality of GNSS satellites at the at least one GNSS receiver 210 and the at least one GNSS receiver 210 calculates a GNSS solution (such as a Position-Velocity-Time (PVT) solution). In examples, the GNSS solution includes a position of the GNSS receiver 210 and a GNSS clock offset. In examples, the GNSS solution can be used with (or in place of) data from the at least one inertial navigation system 204 in determining global position and/or relative position between various systems 200.

In examples, the at least one optional network interface 212 includes or is coupled to at least one optional antenna for communication with a network. In examples, the at least one optional network interface 212 includes at least one of an Ethernet interface, a cellular radio access technology (RAT) radio, a Wi-Fi radio, a Bluetooth radio, or a near field communication (NFC) radio. In examples, the at least one optional network interface 212 includes a cellular radio access technology radio configured to establish a cellular data connection (mobile Internet) of sufficient speeds with a remote server using a local area network (LAN) or a wide area network (WAN). In examples, the cellular radio access technology includes at least one of third generation (3G), fourth generation (4G), fifth generation (5G), etc. or other appropriate communication services or a combination thereof. In examples, the at least one optional network interface 212 includes a Wi-Fi (IEEE 802.11) radio configured to communicate with a wireless local area network. In examples, the at least one optional network interface 212 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the at least one optional display device 214 includes at least one of light emitting diode (LED), liquid crystal display (LCD), light emitting diode (LED) display, organic light emitting diode (OLED) display, MicroLED, or e-ink display. In examples, the at least one optional input device 216 includes at least one of a touchscreen (including capacitive and resistive touchscreens), a stylus, a touchpad, a capacitive button, a mechanical button, a switch, a dial, a keyboard, a mouse, a camera, a biometric sensor/scanner, a microphone, etc. In examples, the at least one optional display device 214 is combined with the at least one optional input device 216 into a human machine interface (HMI) for user interaction with the system(s) 100. In examples, at least one optional power source 218 is used to provide power to the various components of the computing system(s) 100.

Figure 3:
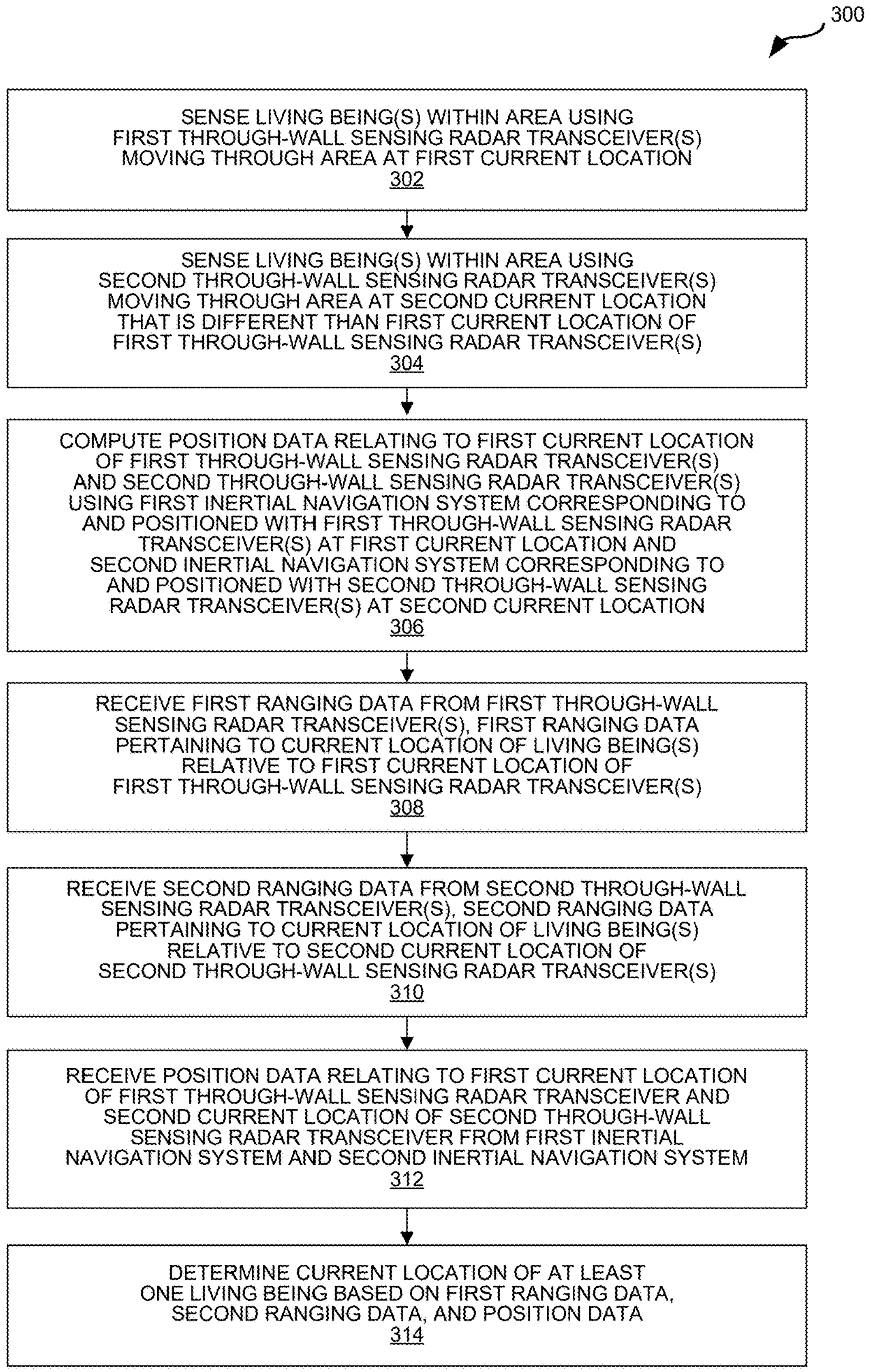
FIG. 3 is an example method for identifying and locating living beings using a plurality of radar transceivers and corresponding inertial navigation systems moving through an area at different positions.

FIG. 3 is an example method 300 for identifying and locating living beings using a plurality of radar transceivers and corresponding inertial navigation systems moving through an area at different positions. In examples, the example method 300 is executed using any of systems 100 (such as any of systems 100A-100D) or system 200 described above.

In examples, method 300 begins at block 302 with sensing at least one living being within an area using at least a first through-wall sensing radar transceiver moving through an area at a first current location. In examples, method 300 proceeds to block 304 with sensing the at least one living being within the area using at least a second through-wall sensing radar transceiver moving through the area at a second current location that is different than the first current location. In examples, the first through-wall sensing radar transceiver and the second through-wall sensing transceiver may be implemented by through-wall sensing radar transceivers 202 described herein above with reference to FIG. 2. In examples, the first through-wall sensing radar transceiver and the first inertial navigation system are mounted to a first vehicle (such as a vehicle 102 from systems 100A-100D). In examples, the second through-wall sensing transceiver and the second inertial navigation system are mounted to a second vehicle (such as vehicle 102 from systems 100A-100D). In examples, the first and second vehicle can be any of a ground vehicle, an airborne vehicle, an aquatic vehicle, or a space vehicle. In examples, the first through-wall sensing radar transceiver and the first inertial navigation system are included in a unit carried by a human or animal. In examples, the second through-wall sensing radar transceiver and the first inertial navigation system are included in a unit carried by a human or animal.

In examples, the at least the first through-wall sensing radar transceiver or the at least the second through-wall sensing radar transceivers each comprise a plurality of through-wall sensing radar transceivers. In examples, the at least the first through-wall sensing radar transceiver comprises a single through-wall sensing radar transceiver. In examples, the at least the second through-wall sensing radar transceiver comprises a single through-wall sensing radar transceiver. In examples, the method 300 proceeds with additionally sensing at least one living being within the area using at least a third through-wall sensing radar transceiver moving through the area at a third current location that is different than the third current location of the at least the third through-wall sensing radar transceiver.

In examples, method 300 proceeds to block 306 with computing position data relating to the first current location of the at least the first through-wall sensing radar transceiver and the second current location of the at least the second through-wall sensing radar transceiver using a first inertial navigation system corresponding to and positioned within the at least the first through-wall sensing radar transceiver at the first current location and a second inertial navigation system corresponding to and positioned with the at least the second through-wall sensing radar transceiver at the second current location.

In examples, the method 300 proceeds to block 308 with receiving first ranging data from the at least the first through-wall sensing radar transceiver, the first ranging data pertaining to a current location of the at least one living being relative to the first current location of the at least the first through-wall sensing radar transceiver. In examples, the method 300 proceeds to block 310 with receiving second ranging data from the at least the second through-wall sensing radar transceiver, the second ranging data pertaining to the current location of the at least one living being relative to the second current location of the at least the second through-wall sensing radar transceiver. In examples, the method 300 proceeds with additionally receiving third sensing data from the at least the third through-wall sensing radar transceiver, the third ranging data pertaining to the current location of the at least one living being relative to the third current location of the at least the third through-wall sensing radar transceiver.

In examples, method 300 proceeds to block 312 with receiving position data relating to the first current location of the at least the first through-wall sensing radar transceiver and the second current location of the at least the second through-wall sensing radar transceiver from at least one of the first inertial navigation system and the second inertial navigation system. In examples, the position data received relates to the first current location of the at least the first through-wall sensing radar transceiver, the second current location of the at least the second through-wall sensing radar transceiver, and the third current location of the at least the third through-wall sensing radar transceiver. In examples, method 300 proceeds additionally with stabilizing the first ranging data pertaining to the current location of the at least one living being relative to the first current location of the at least the first through-wall sensing radar transceiver based on movement of the at least the first through-wall sensing radar transceiver through the area. In examples, method 300 proceeds to block 314 with determining the current location of the at least one living being based on the first ranging data, the second ranging data, and the position data.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium (such as a non-transitory computer-readable medium) tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions (such as a non-transitory computer-readable medium) and data include all forms of non-volatile memory and storage media, including by way of example random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs), magneto-optical disks, and/or the like. Any of the foregoing may be supplemented by, or incorporated in, any known processor, such as a general purpose processor (GPP) or special purpose (such as a field-programmable gate array (FPGA), application-specific integrated circuit (ASIC) or other integrated circuit or circuitry), any programmable logic device, and/or any other circuitry.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

EXAMPLES

Example 1 includes a system, comprising: at least a first through-wall sensing radar transceiver configured to sense at least one living being within an area as the at least the first through-wall sensing radar transceiver moves through the area at a first current location; at least a second through-wall sensing radar transceiver configured to sense the at least one living being within the area as the at least the second through-wall sensing radar transceiver moves through the area at a second current location that is different than the first current location of the at least the first through-wall sensing radar transceiver; a first inertial navigation system positioned with and corresponding to the at least the first through-wall sensing radar transceiver; a second inertial navigation system positioned with and corresponding to the at least the second through-wall sensing radar transceiver, wherein the first inertial navigation system and the second inertial navigation system are configured to compute position data relating to the first current location of the at least the first through-wall sensing radar transceiver and the second current location of the at least the second through-wall sensing radar transceiver; and circuitry configured to: receive first ranging data from the at least the first through-wall sensing radar transceiver, the first ranging data pertaining to a current location of the at least one living being relative to the first current location of the at least the first through-wall sensing radar transceiver while the at least the first through-wall sensing radar transceiver moves through the area; receive second ranging data from the at least the second through-wall sensing radar transceiver, the second ranging data pertaining to the current location of the at least one living being relative to the second current location of the at least the second through-wall sensing radar transceiver while the at least the second through-wall sensing radar transceiver moves through the area; receive the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

Example 2 includes the system of Example 1, further comprising: wherein the at least the first through-wall sensing radar transceiver and the first inertial navigation system are mounted to a first vehicle.

Example 3 includes the system of Example 2, further comprising: wherein the first vehicle is selected from at least one of a ground vehicle, an airborne vehicle, an aquatic vehicle, or a space vehicle.

Example 4 includes the system of any of Examples 1-3, wherein the at least the first through-wall sensing radar transceiver comprises a plurality of through-wall sensing radar transceivers.

Example 5 includes the system of any of Examples 1-4, wherein the first inertial navigation system is configured to stabilize the first ranging data pertaining to the current location of the at least one living being relative to the first current location of the at least the first through-wall sensing radar transceiver based on movement of the at least the first through-wall sensing radar transceiver through the area.

Example 6 includes the system of any of Examples 1-5, further comprising: wherein the at least the first through-wall sensing radar transceiver and the first inertial navigation system are mounted to a first vehicle; and wherein the at least the second through-wall sensing radar transceiver and the second inertial navigation system are mounted to a second vehicle.

Example 7 includes the system of any of Examples 1-6, further comprising: wherein the at least the first through-wall sensing radar transceiver and the second inertial navigation system are housed in a first unit carried by at least one of a first person or a first animal; and wherein the at least the second through-wall sensing radar transceiver and the second inertial navigation system are housed in a second unit carried by at least one of a second person or a second animal.

Example 8 includes the system of any of Examples 1-7, further comprising: wherein the at least the first through-wall sensing radar transceiver and the first inertial navigation system are mounted to a vehicle; and wherein the at least the second through-wall sensing radar transceiver and the second inertial navigation system are housed in a second unit carried by at least a person or an animal.

Example 9 includes the system of any of Examples 1-8, further comprising: at least a third through-wall sensing radar transceiver configured to sense the at least one living being within the area as the at least the third through-wall sensing radar transceiver moves through the area at a third current location that is different than the first current location of the at least the first through-wall sensing radar transceiver and the second current location of the at least the second through-wall sensing radar transceiver.

Example 10 includes a method, comprising: sensing at least one living being within an area using at least a first through-wall sensing radar transceiver moving through the area at a first current location; sensing the at least one living being within the area using at least a second through-wall sensing radar transceiver moving through the area at a second current location that is different than the first current location of the at least the first through-wall sensing radar transceiver; computing position data relating to the first current location of the at least the first through-wall sensing radar transceiver and the second current location of the at least the second through-wall sensing radar transceiver using a first inertial navigation system corresponding to and positioned with the at least the first through-wall sensing radar transceiver at the first current location and a second inertial navigation system corresponding to and positioned with the at least the second through-wall sensing radar transceiver at the second current location; receiving first ranging data from the at least the first through-wall sensing radar transceiver, the first ranging data pertaining to a current location of the at least one living being relative to the first current location of the at least the first through-wall sensing radar transceiver; receiving second ranging data from the at least the second through-wall sensing radar transceiver, the second ranging data pertaining to the current location of the at least one living being relative to the second current location of the at least the second through-wall sensing radar transceiver; receiving the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

Example 11 includes the method of Example 10, further comprising: wherein the at least the first through-wall sensing radar transceiver and the first inertial navigation system are mounted to a first vehicle.

Example 12 includes the method of Example 11, further comprising: wherein the first vehicle is selected from at least one of a ground vehicle, an airborne vehicle, an aquatic vehicle, or a space vehicle.

Example 13 includes the method of any of Examples 10-12, wherein the at least the first through-wall sensing radar transceiver comprises a plurality of through-wall sensing radar transceivers.

Example 14 includes the method of any of Examples 10-13, further comprising: stabilizing the first ranging data pertaining to the current location of the at least one living being relative to the first current location of the at least the first through-wall sensing radar transceiver based on movement of the at least the first through-wall sensing radar transceiver through the area.

Example 15 includes the method of any of Examples 10-14, further comprising: wherein the at least the first through-wall sensing radar transceiver and the first inertial navigation system are mounted to a first vehicle; and wherein the at least the second through-wall sensing radar transceiver and the second inertial navigation system are mounted to a second vehicle.

Example 16 includes the method of any of Examples 10-15, further comprising: wherein the at least the first through-wall sensing radar transceiver and the first inertial navigation system are housed in a first unit carried by a first person or a first animal; and wherein the at least the second through-wall sensing radar transceiver and the second inertial navigation system are housed in a second unit carried by a second person or a second animal.

Example 17 includes the method of any of Examples 10-16, further comprising: wherein the at least the first through-wall sensing radar transceiver and the first inertial navigation system are mounted to a vehicle; and wherein the at least the second through-wall sensing radar transceiver and the second inertial navigation system are housed in a second unit carried by a person or an animal.

Example 18 includes the method of any of Examples 10-17, further comprising: sensing the at least one living being within the area using at least a third through-wall sensing radar transceiver moving through the area at a third current location that is different than the third current location of the at least the third through-wall sensing radar transceiver.

Example 19 includes a system, comprising: at least a first through-wall sensing radar transceiver mounted to a first vehicle, the at least the first through-wall sensing radar transceiver configured to sense at least one living being within an area as the first vehicle moves the at least the first through-wall sensing radar transceiver through the area at a first current location; at least a second through-wall sensing radar transceiver mounted to a second vehicle, the at least the second through-wall sensing radar transceiver configured to sense the at least one living being within the area as the second vehicle moves the at least the first through-wall sensing radar transceiver through the area at a second current location that is different than the first current location of the at least the first through-wall sensing radar transceiver; a first inertial navigation system mounted to the first vehicle, the first inertial navigation system corresponding to the at least the first through-wall sensing radar transceiver; a second inertial navigation system mounted to the second vehicle, the second inertial navigation system corresponding to the at least the second through-wall sensing radar transceiver, wherein the first inertial navigation system and the second inertial navigation system are configured to compute position data relating to the first current location of the at least the first through-wall sensing radar transceiver and the second current location of the at least the second through-wall sensing radar transceiver; and circuitry configured to: receive first ranging data from the at least the first through-wall sensing radar transceiver, the first ranging data pertaining to a current location of the at least one living being relative to the first current location of the at least the first through-wall sensing radar transceiver while the first vehicle moves through the area; receive second ranging data from the at least the second through-wall sensing radar transceiver, the second ranging data pertaining to the current location of the at least one living being relative to the second current location of the at least the second through-wall sensing radar transceiver while the second vehicle moves through the area; receive the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

Example 20 includes the system of Example 19, further comprising: wherein the first vehicle and the second vehicle are selected from at least one of a ground vehicle, an airborne vehicle, an aquatic vehicle, or a space vehicle.

What is claimed is:

1. A system, comprising:

at least a first through-wall sensing radar transceiver configured to sense at least one living being within an area as the at least the first through-wall sensing radar transceiver moves through the area at a first current location;

at least a second through-wall sensing radar transceiver configured to sense the at least one living being within the area as the at least the second through-wall sensing radar transceiver moves through the area at a second current location that is different than the first current location of the at least the first through-wall sensing radar transceiver;

a first inertial navigation system positioned with and corresponding to the at least the first through-wall sensing radar transceiver;

a second inertial navigation system positioned with and corresponding to the at least the second through-wall sensing radar transceiver, wherein the first inertial navigation system and the second inertial navigation system are configured to compute position data relating to the first current location of the at least the first through-wall sensing radar transceiver and the second current location of the at least the second through-wall sensing radar transceiver; and circuitry configured to:

receive first ranging data from the at least the first through-wall sensing radar transceiver, the first ranging data pertaining to a current location of the at least one living being relative to the first current location of the at least the first through-wall sensing radar transceiver while the at least the first through-wall sensing radar transceiver moves through the area;

receive second ranging data from the at least the second through-wall sensing radar transceiver, the second ranging data pertaining to the current location of the at least one living being relative to the second current location of the at least the second through-wall sensing radar transceiver while the at least the second through-wall sensing radar transceiver moves through the area;

receive the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

2. The system of claim 1, further comprising:

wherein the at least the first through-wall sensing radar transceiver and the first inertial navigation system are mounted to a first vehicle.

3. The system of claim 2, further comprising:

wherein the first vehicle is selected from at least one of a ground vehicle, an airborne vehicle, an aquatic vehicle, or a space vehicle.

4. The system of claim 1, wherein the at least the first through-wall sensing radar transceiver comprises a plurality of through-wall sensing radar transceivers.

5. The system of claim 1, wherein the first inertial navigation system is configured to stabilize the first ranging data pertaining to the current location of the at least one living being relative to the first current location of the at least the first through-wall sensing radar transceiver based on movement of the at least the first through-wall sensing radar transceiver through the area.

6. The system of claim 1, further comprising:

wherein the at least the first through-wall sensing radar transceiver and the first inertial navigation system are mounted to a first vehicle; and wherein the at least the second through-wall sensing radar transceiver and the second inertial navigation system are mounted to a second vehicle.

7. The system of claim 1, further comprising:

wherein the at least the first through-wall sensing radar transceiver and the first inertial navigation system are housed in a first unit carried by at least one of a first person or a first animal; and wherein the at least the second through-wall sensing radar transceiver and the second inertial navigation system are housed in a second unit carried by at least one of a second person or a second animal.

8. The system of claim 1, further comprising:

wherein the at least the first through-wall sensing radar transceiver and the first inertial navigation system are mounted to a vehicle; and wherein the at least the second through-wall sensing radar transceiver and the second inertial navigation system are housed in a second unit carried by at least a person or an animal.

9. The system of claim 1, further comprising:

at least a third through-wall sensing radar transceiver configured to sense the at least one living being within the area as the at least the third through-wall sensing radar transceiver moves through the area at a third current location that is different than the first current location of the at least the first through-wall sensing radar transceiver and the second current location of the at least the second through-wall sensing radar transceiver.

10. A method, comprising:

sensing at least one living being within an area using at least a first through-wall sensing radar transceiver moving through an area at a first current location;

sensing the at least one living being within the area using at least a second through-wall sensing radar transceiver moving through the area at a second current location that is different than the first current location of the at least the first through-wall sensing radar transceiver;

computing position data relating to the first current location of the at least the first through-wall sensing radar transceiver and the second current location of the at least the second through-wall sensing radar transceiver using a first inertial navigation system corresponding to and positioned with the at least the first through-wall sensing radar transceiver at the first current location and a second inertial navigation system corresponding to and positioned with the at least the second through-wall sensing radar transceiver at the second current location;

receiving first ranging data from the at least the first through-wall sensing radar transceiver, the first ranging data pertaining to a current location of the at least one living being relative to the first current location of the at least the first through-wall sensing radar transceiver;

receiving second ranging data from the at least the second through-wall sensing radar transceiver, the second ranging data pertaining to the current location of the at least one living being relative to the second current location of the at least the second through-wall sensing radar transceiver;

receiving the position data relating to the first current location of the at least the first through-wall sensing radar transceiver and the second current location of the at least the second through-wall sensing radar transceiver from at least one of the first inertial navigation system and the second inertial navigation system; and determining the current location of the at least one living being based on the first ranging data, the second ranging data, and the position data.

11. The method of claim 10, further comprising:

wherein the at least the first through-wall sensing radar transceiver and the first inertial navigation system are mounted to a first vehicle.

12. The method of claim 11, further comprising:

wherein the first vehicle is selected from at least one of a ground vehicle, an airborne vehicle, an aquatic vehicle, or a space vehicle.

13. The method of claim 10, wherein the at least the first through-wall sensing radar transceiver comprises a plurality of through-wall sensing radar transceivers.

14. The method of claim 10, further comprising:

stabilizing the first ranging data pertaining to the current location of the at least one living being relative to the first current location of the at least the first through-wall sensing radar transceiver based on movement of the at least the first through-wall sensing radar transceiver through the area.

15. The method of claim 10, further comprising:

wherein the at least the first through-wall sensing radar transceiver and the first inertial navigation system are mounted to a first vehicle; and wherein the at least the second through-wall sensing radar transceiver and the second inertial navigation system are mounted to a second vehicle.

16. The method of claim 10, further comprising:

wherein the at least the first through-wall sensing radar transceiver and the first inertial navigation system are housed in a first unit carried by a first person or a first animal; and wherein the at least the second through-wall sensing radar transceiver and the second inertial navigation system are housed in a second unit carried by a second person or a second animal.

17. The method of claim 10, further comprising:

wherein the at least the first through-wall sensing radar transceiver and the first inertial navigation system are mounted to a vehicle; and wherein the at least the second through-wall sensing radar transceiver and the second inertial navigation system are housed in a second unit carried by a person or an animal.

18. The method of claim 10, further comprising:

sensing the at least one living being within the area using at least a third through-wall sensing radar transceiver moving through the area at a third current location that is different than the first current location of the at least the first through-wall sensing radar transceiver and the second current location of the at least the second through-wall sensing radar transceiver.

19. A system, comprising:

at least a first through-wall sensing radar transceiver mounted to a first vehicle, the at least the first through-wall sensing radar transceiver configured to sense at least one living being within an area as the first vehicle moves the at least the first through-wall sensing radar transceiver through the area at a first current location;

at least a second through-wall sensing radar transceiver mounted to a second vehicle, the at least the second through-wall sensing radar transceiver configured to sense the at least one living being within the area as the second vehicle moves the at least the second through-wall sensing radar transceiver through the area at a second current location that is different than the first current location of the at least the first through-wall sensing radar transceiver;

a first inertial navigation system mounted to the first vehicle, the first inertial navigation system corresponding to the at least the first through-wall sensing radar transceiver;

a second inertial navigation system mounted to the second vehicle, the second inertial navigation system corresponding to the at least the second through-wall sensing radar transceiver, wherein the first inertial navigation system and the second inertial navigation system are configured to compute position data relating to the first current location of the at least the first through-wall sensing radar transceiver and the second current location of the at least the second through-wall sensing radar transceiver; and circuitry configured to:

receive first ranging data from the at least the first through-wall sensing radar transceiver, the first ranging data pertaining to a current location of the at least one living being relative to the first current location of the at least the first through-wall sensing radar transceiver while the first vehicle moves through the area;

receive second ranging data from the at least the second through-wall sensing radar transceiver, the second ranging data pertaining to the current location of the at least one living being relative to the second current location of the at least the second through-wall sensing radar transceiver while the second vehicle moves through the area;

receive the position data relating to the first current location of the at least the first through-wall sensing radar transceiver and the second current location of the at least the second through-wall sensing radar transceiver from at least one of the first inertial navigation system and the second inertial navigation system; and determine the current location of the at least one living being based on the first ranging data, the second ranging data, and the position data.

20. The system of claim 19, further comprising:

wherein the first vehicle and the second vehicle are selected from at least one of a ground vehicle, an airborne vehicle, an aquatic vehicle, or a space vehicle.

* * * * *